United States Patent
Choi et al.

(10) Patent No.: US 8,054,767 B2
(45) Date of Patent: Nov. 8, 2011

(54) METHOD OF TRANSMITTING SCHEDULING INFORMATION IN TDD SYSTEM

(75) Inventors: Seung Deog Choi, Anyang-si (KR); Ki Jun Kim, Anyang-si (KR); Suk Hyon Yoon, Anyang-si (KR); Dae Won Lee, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 142 days.

(21) Appl. No.: 12/528,581

(22) PCT Filed: Apr. 10, 2008

(86) PCT No.: PCT/KR2008/002016
§ 371 (c)(1),
(2), (4) Date: Aug. 25, 2009

(87) PCT Pub. No.: WO2008/127015
PCT Pub. Date: Oct. 23, 2008

(65) Prior Publication Data
US 2010/0027446 A1 Feb. 4, 2010

Related U.S. Application Data

(60) Provisional application No. 60/911,243, filed on Apr. 11, 2007.

(30) Foreign Application Priority Data

Aug. 30, 2007 (KR) .................. 10-2007-0087695

(51) Int. Cl.
*H04J 3/00* (2006.01)
*H04W 72/02* (2009.01)

(52) U.S. Cl. ............ 370/280; 370/329; 370/252
(58) Field of Classification Search .......... 370/280, 370/329, 335, 342, 343, 330, 252; 714/749–750
See application file for complete search history.

(56) References Cited

U.S. PATENT DOCUMENTS

| | | | |
|---|---|---|---|
| 6,747,963 B1 | 6/2004 | Park et al. | |
| 6,807,154 B1 | 10/2004 | Malmgren et al. | |
| 6,964,943 B1 | 11/2005 | Hamalainen et al. | |
| 7,088,688 B2 | 8/2006 | Kim et al. | |
| 7,180,877 B1 * | 2/2007 | Benveniste | 370/329 |
| 7,738,908 B2 | 6/2010 | Huh et al. | |
| 7,817,613 B2 | 10/2010 | Anderson | |
| 7,894,389 B2 * | 2/2011 | Hyon et al. | 370/329 |

(Continued)

FOREIGN PATENT DOCUMENTS

KR 10-2001-0040899 5/2001

*Primary Examiner* — Kwang B Yao
*Assistant Examiner* — Candal Elpenord
(74) *Attorney, Agent, or Firm* — McKenna Long & Aldridge LLP (57) ABSTRACT

A method of transmitting scheduling information in time-division-duplex(TDD) system is provided. The method comprises configuring a radio frame, the radio frame comprising at least one downlink subframe and at least one uplink subframe, wherein a downlink subframe is reserved for downlink transmission and an uplink subframe is reserved for uplink transmission, and transmitting scheduling information on a downlink control channel in a downlink subframe, the scheduling information comprising an uplink indicator and uplink resource assignment, the uplink indicator indicating which at least one uplink subframe the uplink resource assignment is valid for. Data can be efficiently transmitted by using an uplink indicator which indicates a specific location of a subframe.

21 Claims, 6 Drawing Sheets

U.S. PATENT DOCUMENTS

| | | | |
|---|---|---|---|
| 2005/0013263 A1* | 1/2005 | Kim et al. | 370/320 |
| 2005/0201319 A1 | 9/2005 | Lee et al. | |
| 2006/0077931 A1* | 4/2006 | Lee et al. | 370/329 |
| 2007/0047474 A1* | 3/2007 | Anderson | 370/277 |
| 2007/0140166 A1* | 6/2007 | Eichinger et al. | 370/329 |
| 2007/0165584 A1* | 7/2007 | Ponnampalam et al. | 370/338 |
| 2007/0230375 A1* | 10/2007 | Yomo et al. | 370/280 |
| 2008/0095106 A1 | 4/2008 | Malladi et al. | |
| 2008/0253326 A1* | 10/2008 | Damnjanovic | 370/329 |
| 2009/0046605 A1* | 2/2009 | Gao et al. | 370/280 |
| 2009/0129259 A1* | 5/2009 | Malladi et al. | 370/210 |
| 2010/0027495 A1* | 2/2010 | Che et al. | 370/329 |
| 2010/0202396 A1* | 8/2010 | Won et al. | 370/329 |

* cited by examiner

METHOD OF TRANSMITTING SCHEDULING INFORMATION IN TDD SYSTEM

This application claims priority to U.S. Provisional Application No. 60/911,243, filed Apr. 11, 2007, Korean Application number 10-2007-0087695, filed Aug. 30, 2007 and International Application No. PCT/KR2008/002016, filed Apr. 10, 2008, all of which are herein incorporated by reference in their entirety.

TECHNICAL FIELD

The present invention relates to wireless communications, and more particularly, to a method of transmitting scheduling information in a time division duplexing (TDD) system.

BACKGROUND ART

Multiple accessing is a technique for identifying different users and duplexing is a technique for identifying uplink and downlink. Similarly to the multiple accessing, the uplink and downlink can be identified in frequency, time, and code domains. The duplexing is classified into frequency division duplexing (FDD), in which the uplink and downlink are identified according to frequencies, and time division duplexing (TDD) in which the uplink and downlink are identified according to times.

In the FDD, frequencies having the same magnitude are symmetrically allocated in the uplink and downlink. The FDD has been widely used due to its structure suitable for symmetric services (e.g., voice calls). In recent years, however, researches on the TDD have actively been conducted due to its structure suitable for asymmetric services (e.g., Internet services). In the FDD, since the uplink and the downlink are identified in the frequency domain, seamless data transmission can be achieved between a base station (BS) and a user equipment (EU) in the time domain for each link.

The TDD is suitable for the asymmetric services since time slots each having a different ratio can be allocated for the uplink and downlink. In addition, a channel condition is almost constant in the uplink and downlink since data is transmitted and received in the same frequency band in the uplink and downlink. Therefore, the channel condition can be immediately estimated when a signal is received. Accordingly, the TDD is suitable for an array antenna technique.

In the TDD, an entire frequency band is used for uplink or downlink, and the uplink and downlink are identified in the time domain. Thus, the frequency band is used for the uplink for a certain period of time and is used for the downlink for the remaining periods of time, thereby disabling simultaneous data transmission/reception between the BS and the UE. If the uplink and downlink are alternately allocated with the same period of time, the BS does not have to inform whether a specific time point is used for uplink transmission or downlink transmission.

In general, scheduling information includes radio resource assignment regarding a radio resource allocated for uplink or downlink transmission. However, the number of downlink subframes may differ from the number of uplink subframes in the TDD system. Further, the number of uplink subframes may be greater than the number of downlink subframes. In addition, switching patterns may be asymmetric between the downlink subframes and the uplink subframes. In this case, uplink or downlink radio resource assignment is not sufficient to indicate a specific subframe. For further accurate scheduling, there is a need for a method of transmitting new scheduling information in the TDD system.

DISCLOSURE OF INVENTION

Technical Problem

The present invention provides a method of transmitting scheduling information, whereby a user equipment performs uplink transmission further accurately by transmitting an uplink indicator that is downlink control information in a time division duplexing (TDD) system.

Technical Solution

According to an aspect of the present invention, A method of transmitting scheduling information in time-division-duplex(TDD) system is provided. The method comprises configuring a radio frame, the radio frame comprising at least one downlink subframe and at least one uplink subframe, wherein a downlink subframe is reserved for downlink transmission and an uplink subframe is reserved for uplink transmission, and transmitting scheduling information on a downlink control channel in a downlink subframe, the scheduling information comprising an uplink indicator and uplink resource assignment, the uplink indicator indicating which at least one uplink subframe the uplink resource assignment is valid for.

According to another aspect of the present invention, a method of transmitting data in TDD system is provided. The method comprises receiving a configuration of a radio frame, the radio frame comprising uplink subframes and downlink subframes, an uplink subframe being reserved for uplink transmission, a downlink subframe being reserved for downlink transmission, the configuration defining a pattern of uplink-downlink subframe allocation in the radio frame, receiving uplink indicator and uplink resource assignment on a downlink control channel in a downlink subframe, the uplink indicator indicating at least one subframe that the uplink resource assignment is valid for, and transmitting data in the uplink subframe using the uplink resource assignment.

According to yet another aspect of the present invention, a method of operating a base station in a wireless communication system is provided. The method comprises configuring a radio frame, the radio frame comprising at least one downlink subframe and at least one uplink subframe, wherein a downlink subframe is reserved for downlink transmission and an uplink subframe is reserved for uplink transmission, transmitting scheduling information on a physical downlink control channel(PDCCH) in a downlink subframe, the scheduling information comprising an uplink indicator, the uplink indicator indicating which uplink subframe an uplink resource assignment is valid for, and receiving uplink data from a user equipment in the uplink subframe indicated by the uplink indicator.

According to yet another aspect of the present invention, a method of transmitting data in a wireless communication system is provided. The method comprises receiving scheduling information on a PDCCH in a downlink subframe, the scheduling information comprising an uplink indicator and uplink resource assignment, the uplink indicator indicating which uplink subframe the uplink resource assignment is valid for, and transmitting uplink data to a base station in the uplink subframe indicated by the uplink indicator.

Advantageous Effects

According to the present invention, in a time division duplexing (TDD) system that transmits data in uplink or downlink by using at least one subframe, an uplink indicator indicates a specific location of a subframe to which a radio resource for a specific user equipment is allocated. Therefore, data can be efficiently transmitted.

MODE FOR THE INVENTION

The present invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

Figure 1:
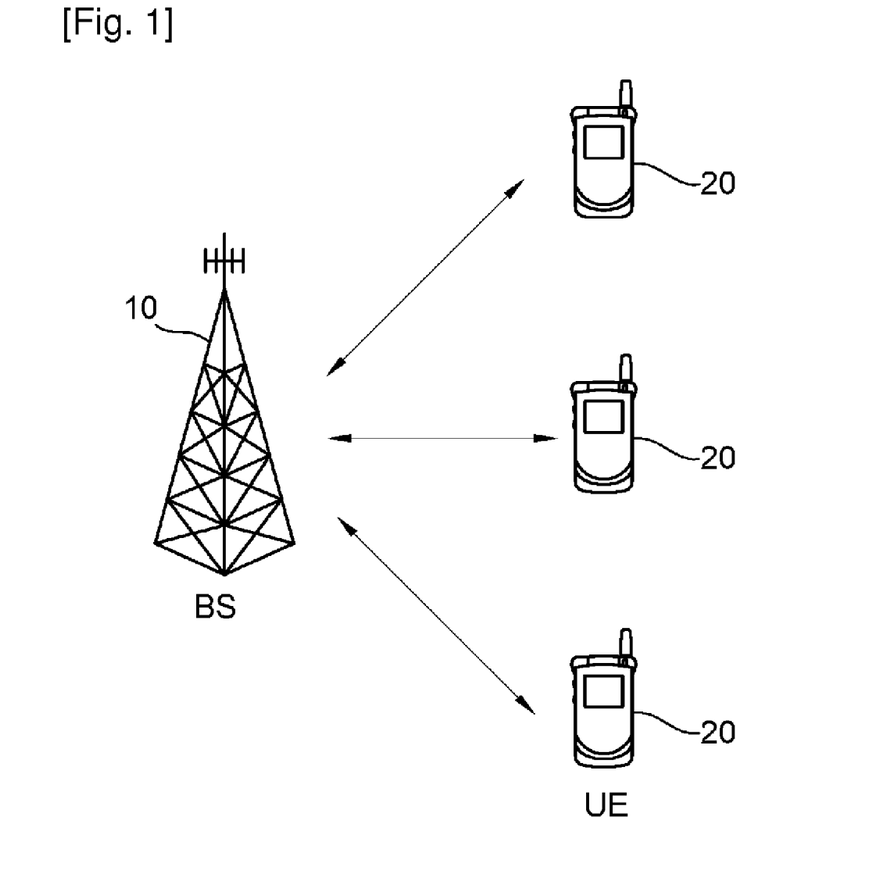
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes a base station (BS) 10 and at least one user equipment (UE) 20. The BS 10 is generally a fixed station that communicates with the UE 20 and may be referred to as another terminology, such as a node-B, a base transceiver system (BTS), an access point, etc. There are one or more cells within the coverage of the BS 10. The UE 20 may be fixed or mobile, and may be referred to as another terminology, such as a mobile station (MS), a user terminal (UT), a subscriber station (SS), a wireless device, etc.

A downlink represents a communication link from the BS 10 to the UE 20, and an uplink represents a communication link from the UE 20 to the BS 10. In downlink, a transmitter may be a part of the BS 10, and a receiver may be a part of the UE 20. In uplink, the transmitter may be a part of the UE 20, and the receiver may be a part of the BS 10.

Different multiple access schemes may be used for downlink and uplink transmissions. For example, orthogonal frequency division multiple access (OFDMA) is used for downlink, and single carrier-frequency division multiple access (SC-FDMA) is used for uplink.

There is no limit in the multiple access scheme used in the wireless communication system. The multiple access scheme may be based on code division multiple access (CDMA), time division multiple access (TDMA), frequency division multiple access (FDMA), SC-FDMA, OFDMA, or other well-known modulation schemes. In these modulation schemes, signals received from multi-users are demodulated to increase capacity of the communication system.

Figure 2:
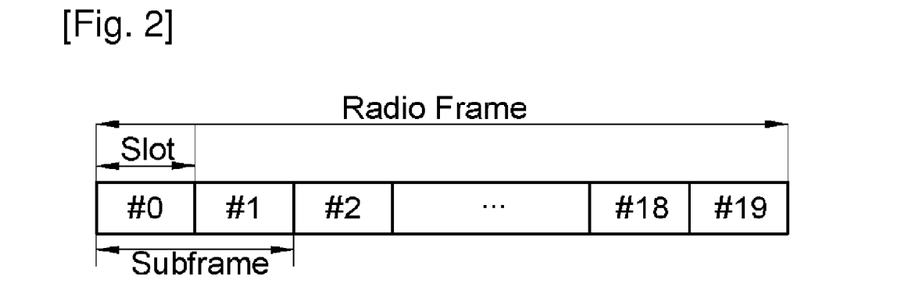
FIG. 2 shows an example of a structure of a radio frame in a time division duplexing (TDD) system.

FIG. 2 shows an example of a structure of a radio frame in a time division duplexing (TDD) system.

Referring to FIG. 2, the radio frame includes 10 subframes. One subframe includes two slots. The subframe is a basic unit of data transmission. Downlink or uplink scheduling is performed in a subframe unit. One slot may include a plurality of OFDM symbols in a time domain and at least one subcarrier in a frequency domain. One slot may include 7 or 6 OFDM symbols.

The structure of the radio frame is shown for exemplary purposes only. Thus, the number of subframes included in the radio frame, the number of slots included in the subframe, the number of OFDM symbols included in the slot, and the number of subcarriers can vary in various manners.

Figure 3:
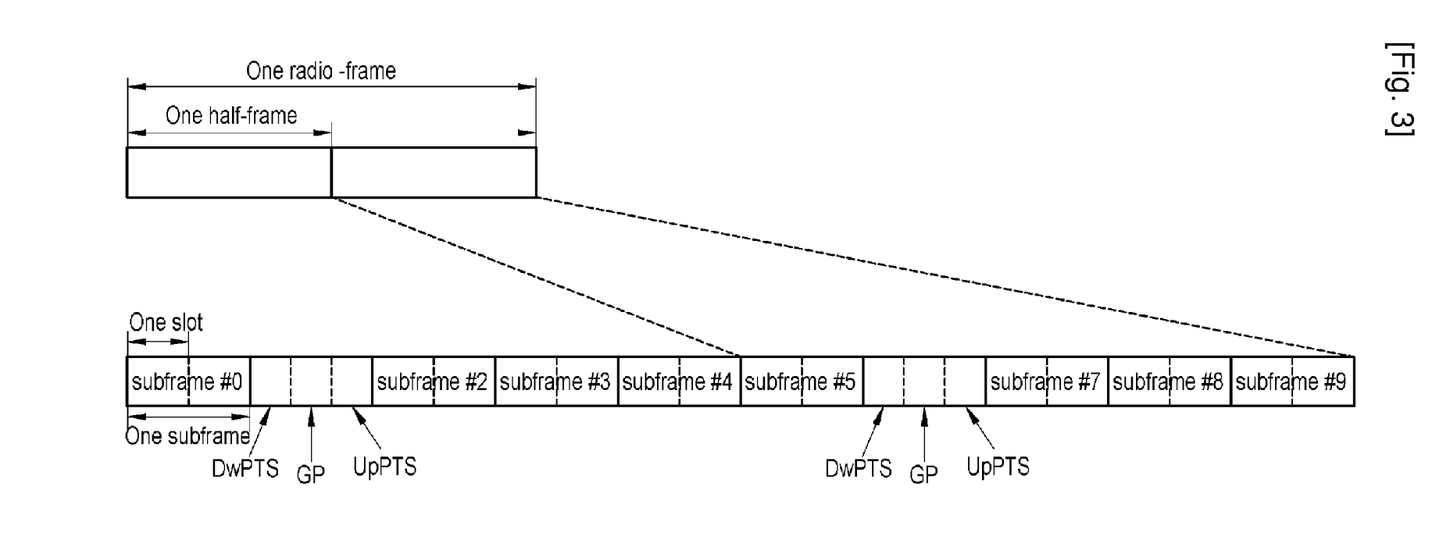
FIG. 3 shows another example of a structure of a radio frame in a TDD system.

FIG. 3 shows another example of a structure of a radio frame in a TDD system.

Referring to FIG. 3, the radio frame includes two half-frames. Each half-frame has the same structure. Specifically, each half-frame includes 5 subframes and 3 fields, i.e., a downlink pilot time slot (DwPTS), a guard period (GP), and an uplink pilot time slot (UpPTS). The DwPTS is used for initial cell search, synchronization, or channel estimation in a UE. The UpPTS is used for channel estimation in a BS and uplink transmission synchronization of the UE. The GP is used to remove interference that occurs in uplink due to a multi-path delay of a downlink signal between uplink and downlink.

Table 1 shows an example of a configuration of the radio resource. The configuration of the radio frame indicates a specific rule according to which all subframes are allocated (or reserved) for uplink or downlink.

TABLE 1

| Config-uration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

In Table 1, 'D' denotes a subframe used for downlink transmission, and 'U' denotes a subframe used for uplink transmission. Further, 'S' denotes a special subframe that is used for a special purpose, such as, frame synchronization or downlink transmission. Hereinafter, a subframe used for downlink transmission is simply referred to as a downlink subframe, and a subframe used for uplink transmission is simply referred to as an uplink subframe. For each configuration, a position and the number of downlink and uplink subframes are different from each other within one radio frame.

A time point at which downlink is switched to uplink, or vice versa, is defined as a switching point. A switch-point periodicity represents a period in which the same switching pattern is repeated between uplink and downlink. The switch-point periodicity is 5 ms or 10 ms. For example, in case of the configuration 1, switching occurs in the pattern of D->S-> U->U->U from 0th to 4th subframes. In addition, from 5th to 9th subframes, switching occurs in the pattern of D->S-> U->U-> U in the same pattern as the previous switching. Since one subframe is 1 ms, the switch-point periodicity is 5 ms. That is, the switch-point periodicity is less than one radio frame length (i.e., 10 ms), and switching is repeated one time within the radio frame.

For all configurations, 0th and 5th subframes and the DwPTS are used for downlink transmission. A 1st subframe in all configurations and a 6th subframe in configurations 0, 1, 2, and 6 are composed of the DwPTS, the GP, and the UpPTS. A time length of each field varies depending on configurations. The remaining 8 subframes other than the 1st and 6th subframes are composed of 2 slots.

If the switch-point periodicity is 5 ms, the UpPTS and 2nd and 7th subframes are reserved for uplink transmission. If the switch-point periodicity is 10 ms, the UpPTS and the 2nd subframe are reserved for uplink transmission, and the DwPTS, and 7th and 9th subframes are reserved for downlink transmission.

The configuration of Table 1 may be system information known by both the BS and the UE. The BS can inform the UE that an uplink-downlink allocation state of the radio frame is modified by transmitting only a configuration index whenever the configuration of the radio frame changes. The configuration is a sort of downlink control information. Similarly to other scheduling information, the configuration may be transmitted on a physical downlink control channel (PDCCH). Alternatively, the configuration may be control information commonly transmitted on a broadcast channel to all UEs existing in a cell. In addition, the configuration may be included in the system information.

The number of half-frames included in the radio frame, the number of subframe included in the half-frame, and the combination of the downlink subframe and the uplink subframe in the TDD system are shown for exemplary purposes only.

Figure 4:
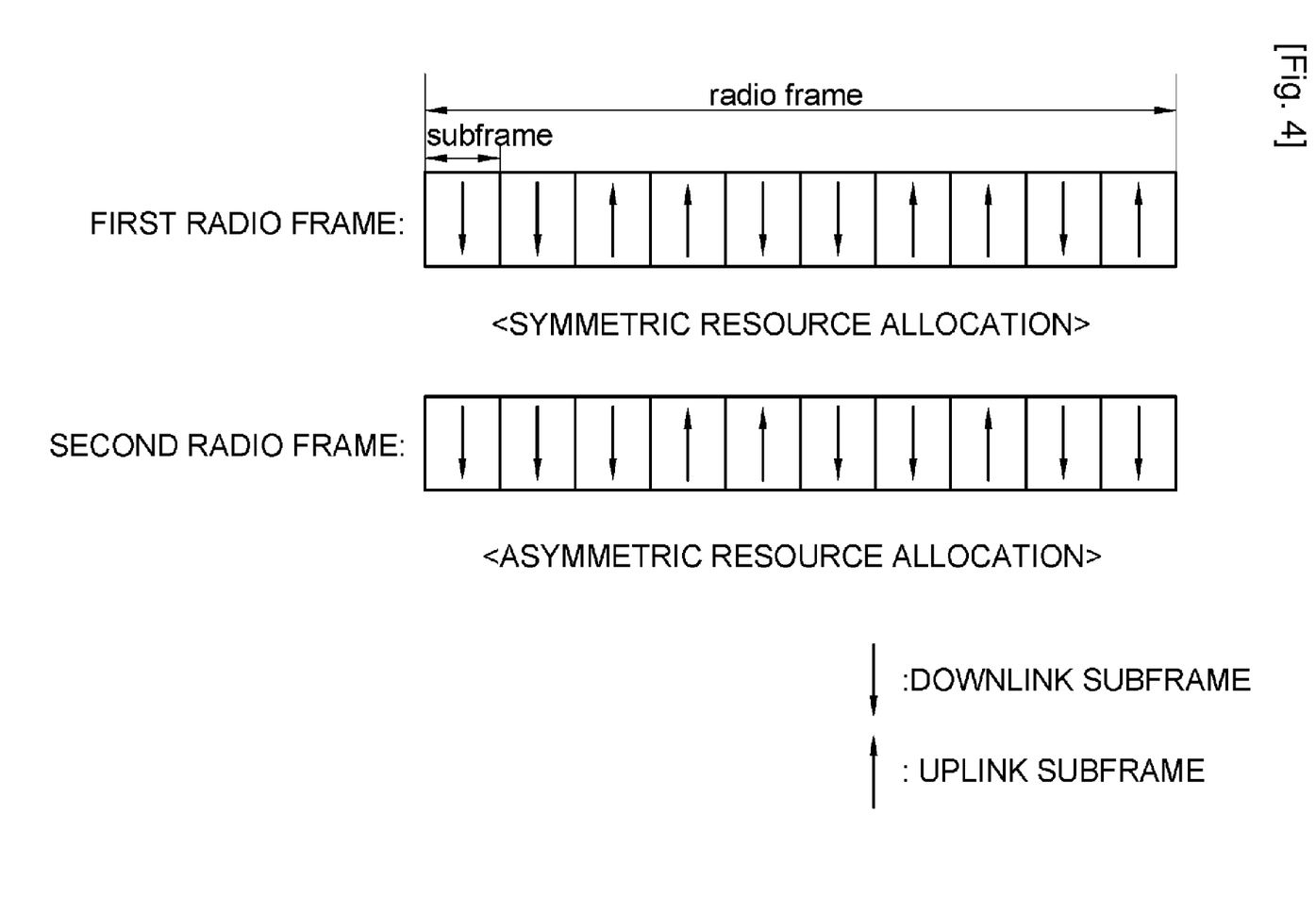
FIG. 4 shows an example of one radio frame which is allocated for uplink and downlink in a subframe unit in a time domain in a TDD system.

FIG. 4 shows an example of one radio frame which is allocated for uplink and downlink in a subframe unit in a time domain in a TDD system.

Referring to FIG. 4, in the TDD system, 0th and 5th subframes of one radio frame must be allocated for downlink, and the remaining subframes are allocated for either downlink or uplink. In this case, the subframes are symmetrically or asymmetrically allocated according to an amount of traffic generation. A TDD frame has a structure in which all subframes can be alternately used for uplink and downlink, or some subframes can be consecutively used for uplink or downlink.

A first radio frame is an example of symmetric resource allocation. A second radio frame is an example of asymmetric resource allocation. In the symmetric resource allocation, the number of subframes used for uplink (hereinafter, uplink subframes) and the number of subframes used for downlink (hereinafter, downlink subframes) are equally repeated. In the asymmetric resource allocation, the number of uplink subframes and the number of downlink subframes are unequally repeated. The first radio frame has a structure in which two downlink subframes and two uplink subframes are repeated. On the other hand, the second radio frame has a structure in which the number of downlink subframes and the number of uplink subframes are not equal.

In the TDD system, switching occurs between the downlink subframes and the uplink subframes at a switching point. At least one switching point exists in one radio frame. A main radio frame and a sub radio frame each have 4 switching points.

Figure 5:
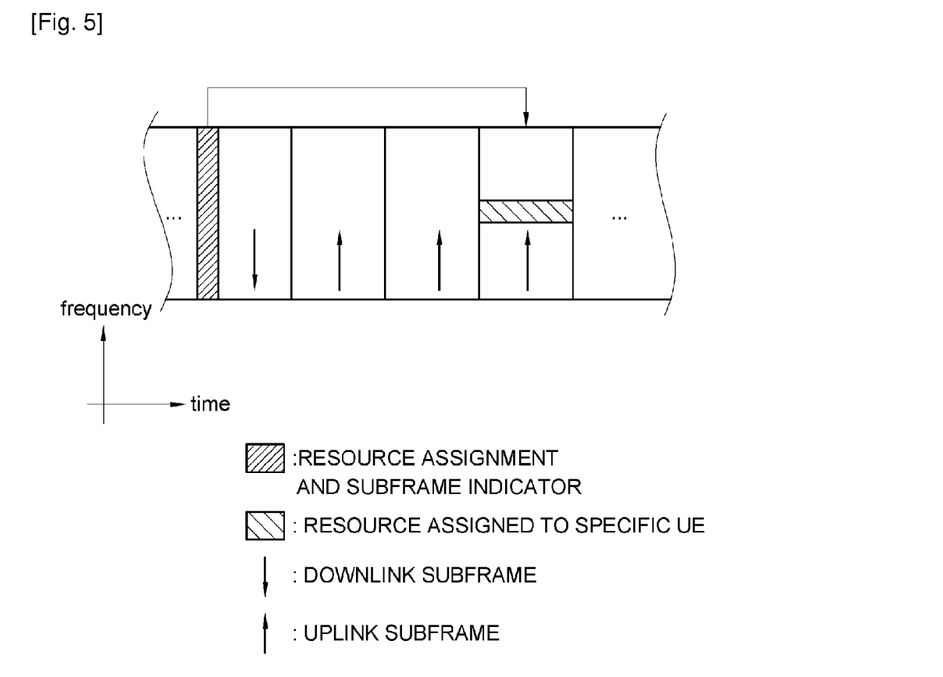
FIG. 5 shows a resource allocation method in a TDD system according to an embodiment of the present invention.

FIG. 5 shows a resource allocation method in a TDD system according to an embodiment of the present invention.

Referring to FIG. 5, a portion of the radio frame includes one downlink subframe and three consecutive uplink subframes. The downlink subframe is indicated by a down-arrow. The uplink subframe is indicated by an up-arrow. A BS configures the radio frame by allocating uplink or downlink to each subframe included in the radio frame. The radio frame may be configured by using any one of configurations selected from uplink-downlink allocations listed in Table 1 above.

Through at least one downlink subframe, the BS transmits scheduling information regarding at least one uplink subframe. The scheduling information includes uplink resource assignment and also includes an uplink indicator which indicates an uplink subframe in which the uplink radio resource assignment is valid.

According to a multiplexing scheme, the uplink radio resource assignment may have information on a frequency band for data transmission when a frequency division multiplexing system (e.g., OFDM) is used, and also may have information on a data transmission code or the like when a code division multiplexing system (e.g., CDMA) is used. The uplink radio resource assignment can represent an assignment state of resource blocks for a specific UE within one subframe. The uplink radio resource assignment may be referred to as uplink grant.

The uplink radio resource assignment and the uplink indicator are scheduling information and are included in downlink control information (DCI). The DCI can be transmitted on a downlink control channel (e.g., PDCCH) within a downlink subframe. The DCI may have a format as shown in Table 2 below.

TABLE 2

| Field | Bits | Comment |
| --- | --- | --- |
| Format | 1 | Uplink grant or downlink assignment |
| Hopping Flag | 1 | Frequency hopping on/off |
| RB assignment | 13 | Resource Block(RB) location and amounts |
| MCS | 5 | Modulation and Coding Scheme |
| TPC | 2 | Power control of PUSCH |
| Uplink indicator(for TDD) | 1 | Used to indicate which uplink subframe(s) the grant is valid for. |
| CQI request | 1 | Channel Quality Information request |
| RNTI/CRC | 16 | 16 bit RNTI implicitly encoded in CRC |
| Total | 44 | |

In Table 2, the field indicates elements included in the DCI. The format indicates whether the DCI transmitted on the PDCCH is used for uplink or downlink. The hopping flag indicates whether frequency hopping is performed or not. The RB assignment indicates a location and amount of an assigned RB. The MCS indicates a modulation and coding level of data to be transmitted/received based on the DCI. The transmit power control (TPC) is control information regarding power to be used by a UE in uplink transmission.

As described above, the uplink indicator indicates an uplink subframe in which the uplink radio resource assignment is valid. Although one bit is assigned to the uplink indicator in Table 2 above, the total bit number may vary as shown in Table 3 to 5 to be described below. When the uplink indicator is 1-bit information, if it is 0, the uplink information may indicate subframes in the range between a downlink subframe, at which the uplink indicator is transmitted, to an nth uplink subframe, and if it is 1, the uplink information may indicate subframes in the range between a downlink subframe, at which the uplink indicator is transmitted, to an (n+1)th uplink subframe.

The uplink indicator can be further effectively used than as indicated in the configuration 0 or 1 in Table 1 above. This is because the number of downlink subframes is greater than the number of uplink subframes in the configuration 0, and thus there is a need to clearly indicate a specific uplink subframe to which the uplink radio resource assignment transmitted through one downlink subframe is applied. On the other hand, if the number of downlink subframe is greater than or equal to the number of uplink subframes, one downlink subframe can be matched to one uplink subframe in 1:1 manner. In this case, without the uplink indicator, the BS and the UE can predetermine that the uplink radio resource assignment of a specific downlink subframe is applied to the specific uplink subframe.

In table 2, the channel quality information (CQI) request is information used to request the UE to feedback the downlink channel information. The radio network temporary identifier (RNTI)/cyclic redundancy check (CRC) is information obtained by masking a CRC and an identifier which indicates control information transmitted on each PDCCH. Therefore, the UE performs de-masking by performing an exclusive OR (XOR) operation between the masked CRC and a cell-radio network temporary identifier (C-RNTI) assigned to the UE, and thus the data can be successfully decoded.

To facilitate explanations, hereinafter, a downlink frame including the uplink indicator is referred to as a self-subframe, and a subframe indicated by the uplink indicator is referred to as a target-subframe. All downlink subframes may be either self-subframes or target-subframes. This is because the self-subframe as a downlink subframe may be indicated by an uplink indicator that exists in another subframe. On the other hand, uplink subframes are target-subframes. This is because the uplink subframe cannot be the self-subframe since the uplink radio resource assignment and the uplink indicator are not included.

TABLE 3

| uplink indicator | target-subframe |
| --- | --- |
| 00 | 0 |
| 01 | 1 |
| 10 | 2 |
| 11 | 3 |

In Table 3, if an uplink indicator is 00, a target-subframe is a self-subframe. Therefore, the self-subframe includes the uplink radio resource assignment of a specific UE together with data for the specific UE. If the uplink indicator is 01, the target-subframe is a subframe immediately next to the self-subframe. If the uplink indicator is 10, the target-subframe is positioned to a 2nd subframe from the self-subframe. If the uplink indicator is 11, the target-subframe is positioned to a 3rd subframe from the self-subframe. In case of FIG. 5, the target-subframe, which includes the uplink data of the specific UE, is the 3rd subframe from the self-subframe. Therefore, the BS transmits the uplink indicator 11 to the specific UE and receives data from the specific UE in the target-subframe.

For another example, in addition to a distance between the self-subframe and the target-subframe, the uplink indicator may indicate the target-subframe by informing whether the target-subframe is a downlink subframe or an uplink subframe. Table 4 shows an example in which link direction information is further added to Table 2 above.

TABLE 4

| uplink indicator | direction of link | target-subframe |
| --- | --- | --- |
| 000 | downlink | 0 |
| 001 | downlink | 1 |
| 010 | downlink | 2 |
| 111 | uplink | 3 |

In Table 4, a 1st bit of an uplink indicator indicates a link direction of a target-subframe, that is, indicates downlink if it is 0 and uplink if it is 1. 2nd and 3rd bits of the uplink indicator indicate a position of the target-subframe. In case of FIG. 5, for a specific UE, the 3rd subframe from the self-subframe is used for uplink as the target-subframe, and thus the uplink indicator is 111. That is, the specific UE receives 111 as the uplink indictor and thus can know that the target-subframe is a subframe spaced apart by 3 subframes from the self-subframe, and can also know that the target-subframe is the uplink subframe.

In general, one radio frame includes 10 subframes. Thus, the total bit number for expressing the uplink indicator can vary depending on the number of subframes. The uplink indicator indicates a subframe (i.e., target-subframe) to which the uplink radio resource assignment is applied. Therefore, even when the target-subframe is indicated by any other formats, it can be included within the technical scope of the present invention.

Figure 6:
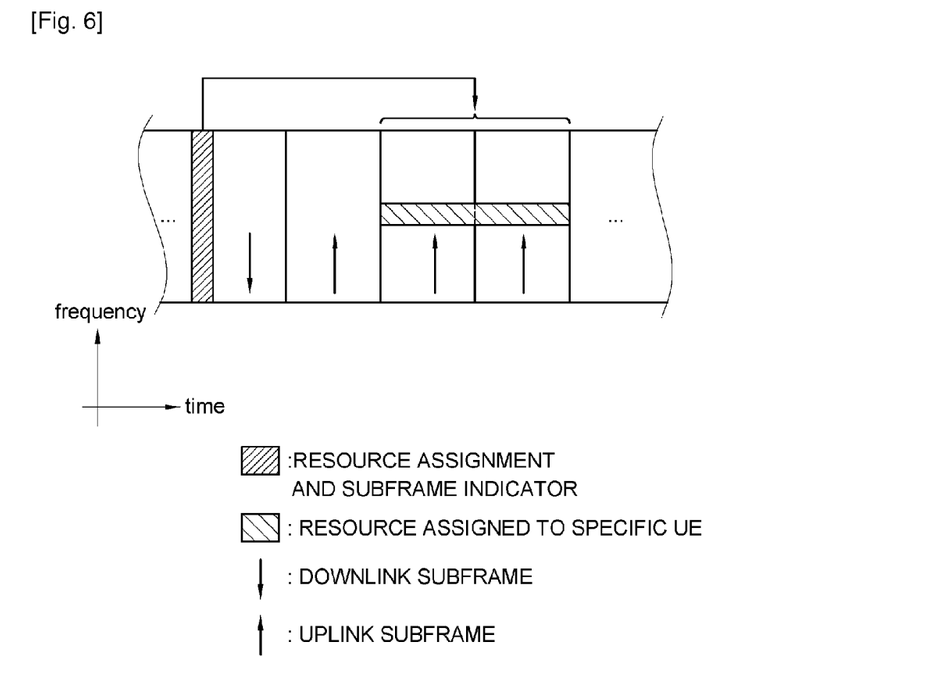
FIG. 6 shows a resource allocation method in a TDD system according to another embodiment of the present invention.

FIG. 6 shows a resource allocation method in a TDD system according to another embodiment of the present invention.

Referring to FIG. 6, similarly to FIG. 5, a portion of the radio frame includes one downlink subframe (i.e., self-subframe) and three consecutive uplink subframes. However, FIG. 6 is different from FIG. 5 in that an uplink indicator of the self-subframe indicates two consecutive target-subframes. As such, when a plurality of consecutive target-subframes is used for uplink for a specific UE, the uplink indicator can be configured as follows.

For example, the uplink indicator informs a starting offset of the target-subframe (hereinafter, simply referred to as a starting offset) and a duration that is the number of consecutive target-subframes. In this case, whether the target-subframe is the uplink subframe or the downlink subframe can be predetermined by a configuration of a radio frame between a BS and a UE. The UE receives the uplink indicator and can recognize the starting offset and the duration to be used for uplink data transmission by using the uplink indicator. Table 5 shows an example of the uplink indicator expressed in 4 bits.

TABLE 5

| uplink indicator | starting offset | duration |
| --- | --- | --- |
| 0001 | 0 | 1 |
| 0010 | 0 | 2 |

TABLE 5-continued

| uplink indicator | starting offset | duration |
|---|---|---|
| 0011 | 0 | 3 |
| 0101 | 1 | 1 |
| 0110 | 1 | 2 |
| 1001 | 2 | 1 |
| 1010 | 2 | 2 |

In table 5, the uplink indicator is expressed in 4 bits. First 2 bits indicate the starting offsets, and next 2 bits indicate the durations. That is, if the uplink indicator is 0001, the starting offset is 0, and the duration is 1. If the starting offset is 0, it indicates that a target-subframe starts from the self-subframe. If the starting offset is 1, it indicates that the target-subframe starts from a next subframe of the self-subframe. If the starting offset is 2, it indicates that the target-subframe starts from a 2nd subframe from the self-subframe. If the duration is 1, it indicates that only one target-subframe is allocated. If the duration is 2, it indicates two target-subframes are allocated, which means that one subframe adjacent to the subframe at the starting offset is further allocated. If the duration is 3, it indicates that three target-subframes are consecutively allocated by including the target-subframe at the starting offset.

In case of FIG. 6, the uplink indicator is as follows. Since two subframes next to the self-subframe are allocated as the target-subframe for a specific UE, the starting offset is 1 and the duration is 2. Therefore, the uplink indicator is 0110. Table 5 above shows only an example of a configuration method in which the starting offset and the duration are included in the uplink indicator and are mapped to bits. The present invention is not limited thereto, and thus the uplink indicator may be expressed in various manners other than as shown in Table 5.

Figure 7:
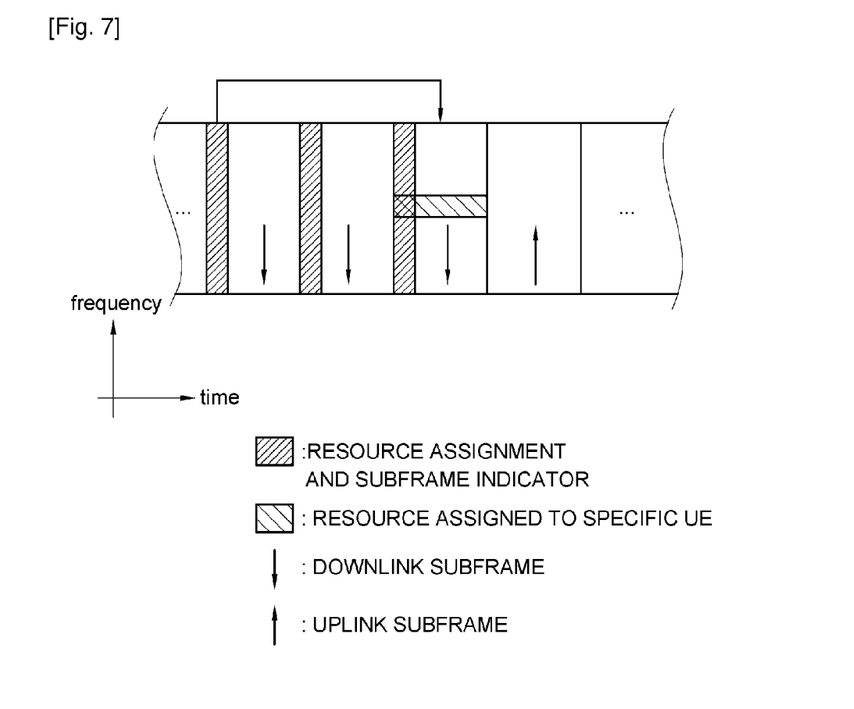
FIG. 7 shows a resource allocation method in a TDD system according to another embodiment of the present invention.

FIG. 7 shows a resource allocation method in a TDD system according to another embodiment of the present invention.

Referring to FIG. 7, a portion of a radio frame includes three consecutive downlink subframes and one uplink subframe. Among the three consecutive downlink subframes, a 1st downlink subframe is a self-subframe and indicates that a downlink indicator is the uplink subframe that is a target-subframe. The remaining downlink subframes are also self-subframes and can include the downlink indicator (or uplink indicator) indicating another subframe.

A BS transmits to a UE downlink assignment and the downlink indicator through the self-subframe.

The UE uses the downlink indicator to examine a position of the target-subframe which includes data to be received by the UE. Then, the UE can receive downlink data through a radio resource indicated by the downlink assignment in the target-subframe. The downlink indicator can be expressed as described in Table 3 or Table 4. In Table 3, the downlink indicator does not have information indicating whether the target-subframe is the downlink subframe or the uplink subframe. The BS and the UE can know this from a configuration of a radio frame. The target-subframe is a 3rd subframe from the self-subframe. Therefore, the BS transmits the downlink indicator 11 to a specific UE.

In Table 4 above, the downlink indicator is as follows. With respect to the specific UE, the 3rd subframe from the self-subframe is the target-subframe, and the target-subframe is the downlink subframe. Therefore, the downlink indicator is 111.

Figure 8:
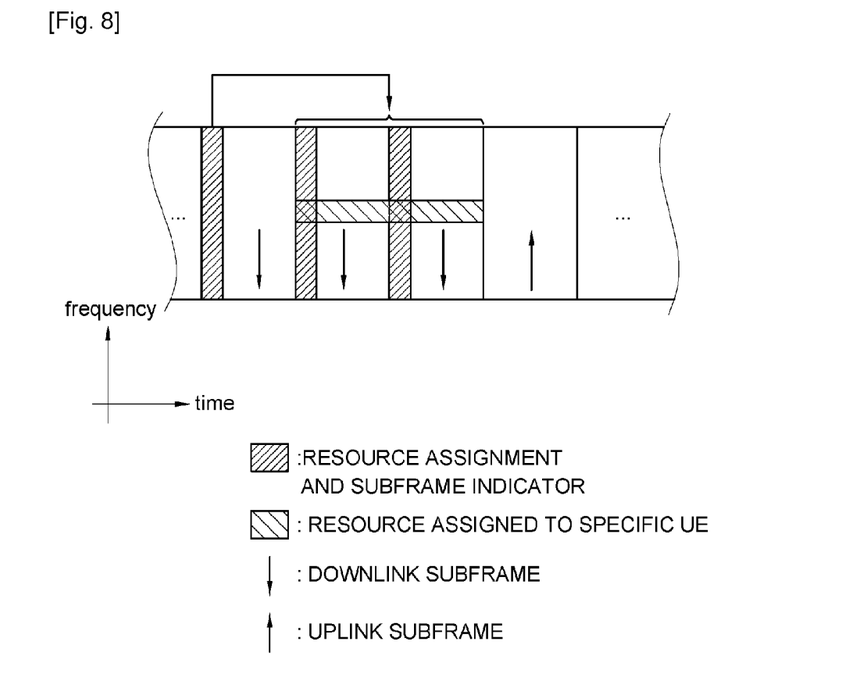
FIG. 8 shows a resource allocation method in a TDD system according to another embodiment of the present invention.

FIG. 8 shows a resource allocation method in a TDD system according to another embodiment of the present invention.

Referring to FIG. 8, similarly to FIG. 7, a portion of a radio frame includes three consecutive downlink subframes and one uplink subframe. FIG. 8 is different from FIG. 7 in that two consecutive target-subframes are used for downlink for a specific UE. As such, when a plurality of consecutive target-subframes is used for downlink for the specific UE, a downlink indicator can be expressed by referring to Table 5 above.

Referring to Table 5 above, in the self-subframe, two subframes next to the 2nd subframe are allocated to the specific UE as the target-subframes. Thus, the starting offset is 2 and the duration is 2. Accordingly, the downlink indicator is 1010.

Now, a method of efficiently transmitting an acknowledgement (ACK)/not-acknowledgement (NACK) signal in a TDD system will be described. In an automatic repeat request (ARQ) scheme, when a receiver successfully receives data, the receiver transmits an ACK signal to a transmitter so that the transmitter transmits new data. On the contrary, if the receiver cannot successfully receive the data, the receiver transmits a NACK signal to the transmitter so that the transmitter retransmits that data.

The TDD system must be able to accurately indicate a downlink subframe to which the ACK/NACK signal transmitted in uplink is associated among pervious downlinks. Likewise, the TDD system must be able to accurately indicate an uplink subframe to which the ACK/NACK signal transmitted in downlink is associated among previous uplinks.

Since a plurality of subframes can be continuously transmitted in downlink in the TDD system, an amount of the ACK/NACK signal increases in proportion to an amount of received data. Thus, excessive uplink overhead may occur when the downlink subframe is informed to which downlink subframe the ACK/NACK signal is associated. Therefore, the ACK/NACK signal must be efficiently transmitted by using limited time and frequency resources. This may become further serious when resources are not equally allocated between uplink and downlink. Accordingly, there is a need for a method capable of efficiently reducing overhead resulted from the ACK/NACK signal.

Figure 9:
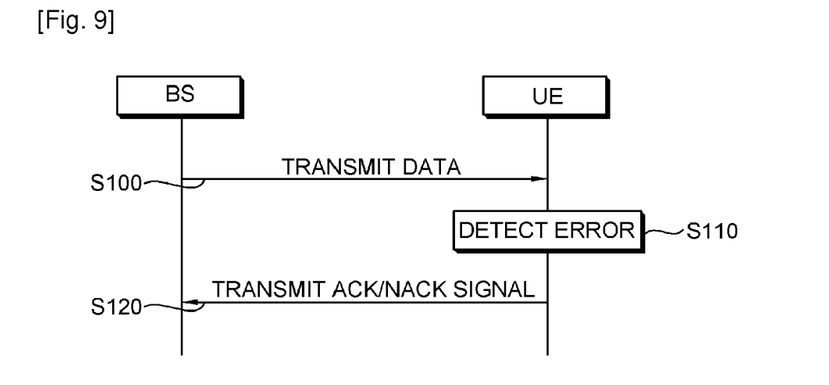
FIG. 9 shows an example of a method of transmitting an acknowledgement (ACK)/not-acknowledgement (NACK) signal.

FIG. 9 shows an example of a method of transmitting an ACK/NACK signal.

Referring to FIG. 9, a BS transmits data to a UE (step S100). The UE detects errors from the received data (step S110). Unlike the conventional ARQ, when hybrid ARQ (HARQ) is used, the errors can be directly detected in a physical layer. According to the error detection result, the UE transmits an ACK/NACK signal to the BS (step S120). Upon successfully receiving the data, the UE transmits the ACK signal to the BS so that the BS transmits new data. On the contrary, if the UE fails in receiving the data, the UE transmits an NACK signal to the BS so that the BS retransmits that data.

Figure 10:
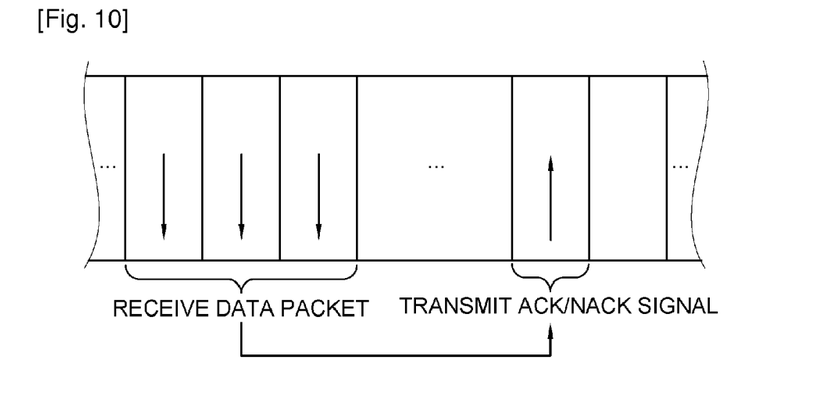
FIG. 10 shows another example of a method of transmitting an ACK/NACK signal.

FIG. 10 shows another example of a method of transmitting an ACK/NACK signal.

Referring to FIG. 10, a UE receives data in downlink and transmits an ACK/NACK signal in uplink in a TDD system in which the number of subframes used for downlink transmission is not equal to the number of subframes used for uplink transmission.

When a plurality of contiguous subframes is allocated in downlink in one UE, all data transmitted in the consecutive downlink frames is regarded as one data packet, and thus one ACK/NACK signal is allocated to one data packet. When a plurality of consecutive subframes is allocated to a specific UE in downlink transmission, the downlink data is regarded as one HARQ packet and then the ACK/NACK signal is transmitted.

The UE regards data, which occupies three consecutive subframes and is transmitted in downlink, as one data packet.

Thus, when errors are detected from only a portion of the data packet in reception, the UE transmits the NACK signal through an uplink subframe temporally separated from the three consecutive subframes, and transmits the ACK signal in uplink when the entire portion of the packet data is successfully received. Although it is shown in FIG. 9 that the UE is an entity for transmitting the ACK/NACK signal, the BS also can transmit the ACK/NACK signal in the same manner. In addition, although it has been described in FIG. 10 that the ACK/NACK signal is a feedback control signal for the consecutive subframes, this is for exemplary purposes only. Thus, the ACK/NACK signal can be not only the feedback control signal for consecutive subframes but also a feedback control signal for a plurality of subframes in an arbitrary location within a radio frame.

Figure 11:
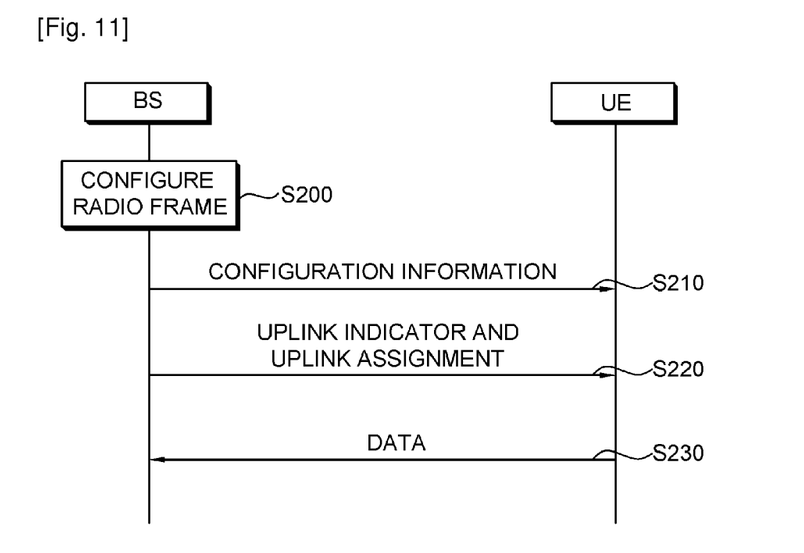
FIG. 11 is a flow diagram showing a communication method in a TDD system according to an embodiment of the present invention.

FIG. 11 is a flow diagram showing a communication method in a TDD system according to an embodiment of the present invention.

Referring to FIG. 11, a BS configures a radio frame (step S200). The radio frame includes at least one downlink subframe and at least one uplink subframe. The downlink subframe is reserved for downlink transmission, and the uplink subframe is reserved for uplink transmission. The configuration of the radio frame means whether each of a plurality of subframe included in the radio frame will be allocated for uplink transmission or for downlink transmission. Information regarding a pattern of downlink-uplink assignments within one radio frame is referred to as "configuration information (or simply configuration)" or "information on a configuration". The configuration may be the same as shown in Table 1 above.

The BS transmits the configuration of the radio frame to a UE (step S210). The configuration of the radio frame may be selected from Table 1 above. The configuration can be transmitted on a broadcast channel. The configuration can be transmitted on a PDCCH that is a downlink channel. The configuration can be transmitted as a part of system information.

The BS transmits to the UE an uplink indicator and uplink radio resource assignment (step S220). The uplink indicator and the uplink radio resource assignment are scheduling information and can be included together in a DCI format as shown in Table 2 above. Alternatively, the uplink indicator and the uplink radio resource assignment can be separately transmitted at different time points or on separate channels. The uplink indicator indicates an uplink subframe in which the uplink radio resource assignment is valid. In an uplink subframe indicated by the uplink indicator, the uplink radio resource assignment indicates a radio resource (e.g., resource block (RB)) to be used by the UE in uplink transmission.

The UE transmits data to the BS by using the configuration, the uplink indicator, and the uplink radio resource assignment (step S230).

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of transmitting scheduling information by a base station (BS) in a time-division-duplex (TDD) mobile communication system, the method comprising:
   transmitting configuration information of a radio frame to a user equipment (UE), the configuration information indicating to which subframe in the radio frame is reserved for uplink or downlink; and
   transmitting scheduling information on a downlink control channel in a downlink subframe of the radio frame to the UE, the scheduling information comprising an uplink indicator and an uplink resource block (RB) assignment, wherein the uplink indicator identifies at least one uplink subframe in a time domain for which the uplink RB assignment is valid and wherein the uplink RB assignment identifies at least one RB reserved in a frequency domain for uplink data transmission in the at least one uplink subframe,
   wherein the configuration information indicates one of uplink-downlink configuration of the table below

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D. |

2. The method of claim 1, wherein the uplink indicator comprises one or more bits, and wherein the value of the one or more bits defines the position of the one or more uplink subframes in the radio frame, for which the uplink RB assignment is valid, relative to the position of another subframe.

3. The method of claim 1, wherein the uplink indicator comprises a plurality of bits, and wherein the value of the uplink indicator bits defines the position of the plurality of uplink subframes in the radio frame, relative to the position of another subframe, that are contiguous with each other.

4. The method of claim 1, wherein the downlink control channel is a physical downlink control channel (PDCCH).

5. The method of claim 1, wherein the number of downlink subframes is less than the number of uplink subframes.

6. The method of claim 1, wherein the radio frame comprises a plurality of uplink subframes, and wherein the uplink indicator identifies two consecutive uplink subframes for which the uplink resource assignment is valid.

7. The method of claim 2, wherein the another subframe is a self-subframe.

8. The method of claim 1, further comprising:
   transmitting data over a plurality of downlink subframes to the UE;
   receiving an acknowledgement/non-acknowledgement (ACK/NACK) signal over an uplink subframe from the UE, the uplink subframe being configured by the configuration information, the ACK/NACK signal indicating whether the UE successfully receives the transmitted data within 10 subframes from the BS or not.

9. The method of claim 8, wherein the ACK/NACK signal acknowledges reception of the data if the UE detects no error within 10 subframes.

10. The method of claim 8, wherein the ACK/NACK signal negatively acknowledges reception of the data if the UE detects an error within 10 subframes.

11. The method of claim 8, wherein the ACK/NACK signal is corresponding to the detection of an error from the data transmitted over predetermined number of downlink subframes.

12. The method of claim 8, wherein the ACK/NACK signal is transmitted by grouping the plurality of downlink subframes based on the configuration information.

13. The method of claim 1, the configuration information indicates uplink-downlink configuration 0 in the table.

14. A method of transmitting data by a user equipment (UE) in a time-division-duplex (TDD) mobile communication system, the method comprising:

receiving configuration information of a radio frame from a base station (BS), the configuration information indicating to which subframe in the radio frame is reserved for uplink or downlink;

receiving scheduling information, including an uplink indicator and an uplink resource block (RB) assignment, on a downlink control channel in a downlink subframe of the radio frame from the BS, wherein the uplink indicator identifies at least one uplink subframe in a time domain for which the uplink RB assignment is valid and wherein the uplink RB assignment identifies at least one RB reserved in a frequency domain for uplink data transmission in the at least one uplink subframe; and transmitting mobile communication data in the at least one uplink subframe through the at least one RB identified by the uplink resource assignment, wherein the configuration information indicates one of uplink-downlink configuration of the table below

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D. |

15. The method of claim 14, wherein the configuration information is received as a part of system information (SI).

16. The method of claim 14, wherein the uplink indicator comprises a plurality of bits, wherein the value of the uplink indicator bits defines the position of a plurality of contiguous uplink subframes in the radio frame relative to the position of another subframe.

17. The method of claim 14, wherein the uplink indicator comprises one or more bits, and wherein the value of the one or more bits defines the position of the one or more uplink subframes in the radio frame, for which the uplink RB assignment is valid, relative to the position of another subframe.

18. The method of claim 17, wherein the another subframe is a self-subframe.

19. The method of claim 14, wherein the number of downlink subframes is less than the number of uplink subframes.

20. The method of claim 14, wherein the uplink indicator identifies two consecutive uplink subframes the uplink resource assignment is valid.

21. The method of claim 14, the configuration information indicates uplink-downlink configuration 0 in the table.

* * * * *